US009666582B1

United States Patent
Li et al.

(10) Patent No.: US 9,666,582 B1
(45) Date of Patent: May 30, 2017

(54) ON-CHIP FINFET STRUCTURES TO IMPLEMENT PHYSICAL UNCLONABLE FUNCTION FOR SECURITY APPLICATION

(71) Applicant: GLOBALFOUNDRIES INC., Grand Cayman (KY)

(72) Inventors: Wai-Kin Li, Hopewell Junction, NY (US); Chengwen Pei, Danbury, CT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 15/230,632

(22) Filed: Aug. 8, 2016

(51) Int. Cl.
| | |
|---|---|
| H01L 21/8232 | (2006.01) |
| H01L 27/088 | (2006.01) |
| H01L 21/8234 | (2006.01) |
| H01L 27/02 | (2006.01) |
| H01L 29/08 | (2006.01) |
| H01L 23/00 | (2006.01) |

(52) U.S. Cl.
CPC .. *H01L 27/0886* (2013.01); *H01L 21/823418* (2013.01); *H01L 21/823431* (2013.01); *H01L 23/576* (2013.01); *H01L 27/0207* (2013.01); *H01L 29/0847* (2013.01)

(58) Field of Classification Search
CPC .................... H01L 21/823431; H01L 27/0886
USPC .................................. 438/275; 257/288, 624
See application file for complete search history.

(56) References Cited

U.S. PATENT DOCUMENTS

| | | | |
|---|---|---|---|
| 8,525,549 | B1 | 9/2013 | Feng et al. |
| 8,941,405 | B2 | 1/2015 | Chi et al. |
| 9,570,555 | B1 * | 2/2017 | Pranatharthiharan H01L 29/0847 |
| 2007/0063276 | A1 * | 3/2007 | Beintner ............... H01L 21/845 257/347 |
| 2010/0322418 | A1 | 12/2010 | Potkonjak |
| 2011/0163088 | A1 | 7/2011 | Besling et al. |
| 2011/0254141 | A1 | 10/2011 | Roest et al. |
| 2013/0233608 | A1 | 9/2013 | Feng et al. |
| 2015/0084193 | A1 | 3/2015 | Feng et al. |
| 2015/0154421 | A1 | 6/2015 | Feng et al. |

OTHER PUBLICATIONS

Gassend, B., et al.; "Silicon Physical Random Functions"; Proceedings of the 9th ACM Conference on Computer and Communications Security (CCS), Nov. 2002, pp. 148-160.

(Continued)

*Primary Examiner* — George Fourson, III
(74) *Attorney, Agent, or Firm* — Scully Scott Murphy and Presser; Frank DiGiglio (57) ABSTRACT

Devices and methods are provided for constructing a semiconductor structure that implements a PUF (physical unclonable function) based on a FinFET structure. The PUF is based on a random pattern of merged and non-merged source and drain structures, which are formed on adjacent semiconductor fin structures of adjacent pairs of FinFET devices, as a result of process-induced variations in the epitaxial growth of source and drain structures on the semiconductor fin structures. The random pattern of merged and non-merged source and drain structures provides a random pattern of electrical open and short connections between pairs of semiconductor fin structures, wherein the random pattern of electrical open and short connections defines the physical unclonable function.

17 Claims, 8 Drawing Sheets

(56) References Cited

OTHER PUBLICATIONS

Kumar, S.S., "Extended Abstract The Butterfly PUF Protecting IP on Every FPGA," IEEE International Workshop on Hardware-Oriented Security and Trust (HOST), Jun. 2008, pp. 67-70.

Fitzpatrick, Tony, "Magneprint Technology Licensed to TRAX Systems, Inc.", Newsroom, Washington University in St. Louis, http://news-info.wusti.edu/tips/page/normal/4159.html, Nov. 11, 2004, 2 pages.

C. Bohm, et al., "A Microcontroller SRAM-PUF", 5th IEEE International Conference on Network and System Security (NSS), Sep. 2011, pp. 269-273, Milan, Italy.

\* cited by examiner

ON-CHIP FINFET STRUCTURES TO IMPLEMENT PHYSICAL UNCLONABLE FUNCTION FOR SECURITY APPLICATION

TECHNICAL FIELD

This disclosure relates generally to semiconductor devices and, more specifically, to semiconductor devices having PUF (physical unclonable function) structures for security applications.

BACKGROUND

The use of integrated circuits (ICs) to store sensitive data and perform secure transactions has become increasingly ubiquitous. As a result, ICs often require protection against attacks that aim to extract information. A physical unclonable function (PUF) is a cost-effective way of providing an extra layer of protection against physical attacks. Rather than storing secret keys in non-volatile memory, which is often difficult and expensive, a PUF extracts secrets from complex physical systems. Typically, a PUF is a function that is embodied in a physical structure, which is easy to evaluate but hard to predict. The physical structure that implements the PUF consists of at least one random component, wherein the fabrication of such random component cannot be easily controlled or duplicated over a given die or across dies, even given the same exact manufacturing process used to fabricate the random component. For example, previous techniques for implementing PUF structures generate randomness based on process-induced variations in active device parameters such as threshold voltages, transconductance, delay, and operating conditions, such as voltage or temperature. With the fast development of cloud computing systems and network communication systems, the use of PUFs are becoming a critical part of such systems.

SUMMARY

Embodiments of the invention generally include semiconductor devices, methods, and integrated circuits for implementing a physical unclonable function based on randomness in a merging of epitaxial source/drain structures of adjacent pairs of FinFET devices, resulting in a random pattern of electrical open/short connections.

One embodiment includes a method for fabricating a semiconductor device comprising a PUF structure. The method includes forming a plurality of semiconductor fin structures on a substrate, wherein the semiconductor fin structures comprise a first pattern and a second pattern of semiconductor fin structures. The first and second patterns of semiconductor fin structures are formed such that end portions of the first pattern of semiconductor fin structures partially overlap, and are interdigitated with, end portions of the second pattern of semiconductor fin structures, wherein one or more overlapping end portions of the semiconductor fin structures are separated by a distance D1, and wherein one or more overlapping end portions of the semiconductor fin structures are separated by a distance D2, wherein D2>D1. A first control gate is formed over the first pattern of semiconductor fin structures, and a second control gate is formed over the second pattern of semiconductor fin structures. Semiconductor layers are epitaxially grown on the end portions of the semiconductor fin structures to form source and drain structures. The distance D1 is selected so that the step of epitaxially growing semiconductor layers on the end portions of the semiconductor fin structures results in a random pattern of merged and non-merged source and drain structures formed on the overlapping end portions of the semiconductor fin structures which are separated by the distance D1. The random pattern of merged and non-merged source and drain structures provides a random pattern of electrical open and short connections between pairs of semiconductor fin structures which have overlapping end portions separated by the distance D1, wherein the random pattern of electrical open and short connections between the pairs of semiconductor fin structures implements a PUF (physical unclonable function) structure.

These and other embodiments will be described in the following detailed description of embodiments, which is to be read in conjunction with the accompanying figures.

BRIEF DESCRIPTION OF THE DRAWINGS

FIGS. 1A and 1B schematically illustrate semiconductor structure comprising a physical unclonable function that is implemented using a FinFET structure, according to an embodiment of the invention, wherein FIG. 1A is a top plan schematic view of the semiconductor structure, and wherein

FIGS. 3, 4, 5A, 5B, 6A, 6B, 7A, and 7B schematically illustrate a method for fabricating the semiconductor structure of FIGS. 1A/1B, according to an embodiment of the invention, wherein:

FIGS. 5A and 5B are schematic views of the semiconductor structure after patterning the nitride layer to form a hard mask pattern, according to an embodiment of the invention, wherein

FIGS. 6A and 6B are schematic views of the semiconductor structure after patterning the SOI layer using the hard mask pattern to form a plurality of semiconductor fin structures, according to an embodiment of the invention, wherein FIG. 6A is a top plan schematic view of the semiconductor structure, and wherein

FIGS. 7A and 7B are schematic views of the semiconductor structure after removing the hard mask pattern and forming control gate structures over the semiconductor fin structures, according to an embodiment of the invention, wherein FIG. 7A is a top plan schematic view of the semiconductor structure, and wherein FIGS. 8A and 8B are schematic views of the semiconductor structure after performing a source/drain epitaxy process to form source and drain structures, according to an embodiment of the invention, wherein FIG. 8A is a top plan view of the semiconductor structure, and wherein

DETAILED DESCRIPTION OF EMBODIMENTS

Embodiments of the invention will now be described in further detail with regard to semiconductor devices, integrated circuits, and methods for providing a semiconductor structure that implements a PUF (physical unclonable function) based on a FinFET structure. The PUF is based on a random pattern of merged and non-merged source and drain structures, which are formed on adjacent semiconductor fin structures of adjacent pairs of FinFET devices, as a result of process-induced variations in the epitaxial growth of source and drain structures on the semiconductor fin structures. The random pattern of merged and non-merged source and drain structures provides a random pattern of electrical open and short connections between pairs of semiconductor fin structures, wherein the random pattern of electrical open and short connections defines the physical unclonable function.

It is to be understood that the various layers, structures, and regions shown in the accompanying drawings are schematic illustrations that are not drawn to scale. In addition, for ease of explanation, one or more layers, structures, and regions of a type commonly used to form semiconductor devices or structures may not be explicitly shown in a given drawing. This does not imply that any layers, structures, and regions not explicitly shown are omitted from the actual semiconductor structures.

Furthermore, it is to be understood that the embodiments discussed herein are not limited to the particular materials, features, and processing steps shown and described herein. In particular, with respect to semiconductor processing steps, it is to be emphasized that the descriptions provided herein are not intended to encompass all of the processing steps that may be required to form a functional semiconductor integrated circuit device. Rather, certain processing steps that are commonly used in forming semiconductor devices, such as, for example, wet cleaning and annealing steps, are purposefully not described herein for economy of description.

Moreover, the same or similar reference numbers are used throughout the drawings to denote the same or similar features, elements, or structures, and thus, a detailed explanation of the same or similar features, elements, or structures will not be repeated for each of the drawings. It is to be understood that the term "about" as used herein with regard to thicknesses, percentages, ranges, etc., is meant to denote being close or approximate to, but not exactly. For example, the term "about" as used herein implies that a small margin of error is present, such as 1% or less than the stated amount.

Figure 1A:
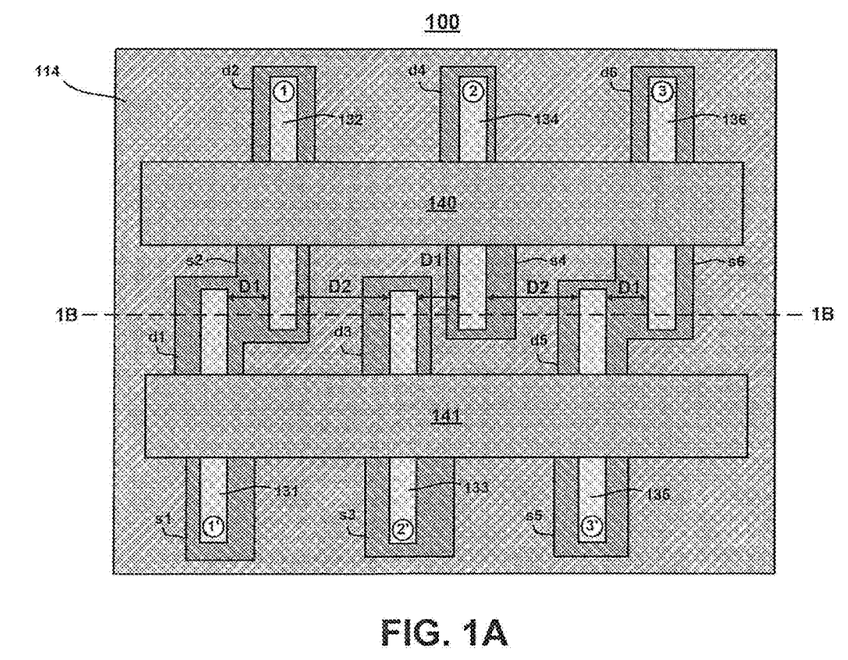
Figure 1B:
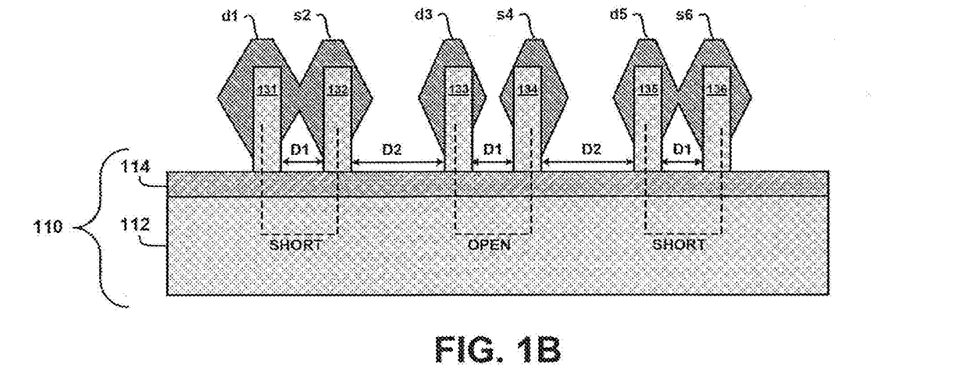
FIG. 1B is a schematic cross-sectional view of the semiconductor structure taken along line 1B-1B in FIG. 1A.

FIGS. 1A and 1B schematically illustrate semiconductor structure 100 comprising a physical unclonable function that is implemented using a FinFET structure, according to an embodiment of the invention. FIG. 1A is a top plan schematic view of the semiconductor structure 100, and FIG. 1B is a schematic cross-sectional view of the semiconductor structure 100 taken along line 1B-1B in FIG. 1A. As shown in FIGS. 1A and 1B, the semiconductor structure 100 comprises a semiconductor substrate 110, a plurality of semiconductor fin structures 131, 132, 133, 134, 135, and 136 formed on the substrate 110, and first and second control gate structures 140 and 141. In one embodiment of the invention, the substrate 110 comprises a base substrate 112 (e.g., silicon layer) and an insulating layer 114. In one embodiment of the invention, the semiconductor fin structures 131, 132, 133, 134, 135, and 136 are patterned from an active silicon layer (e.g., SOI layer 116, FIG. 3) formed on the insulating layer 114.

The semiconductor fin structures 131, 132, 133, 134, 135, and 136 comprise a first pattern of semiconductor fin structures (132, 134, and 136), and a second pattern of semiconductor fin structures (131, 133, and 135). As shown in FIG. 1A, the first control gate 140 is formed over the first pattern of semiconductor fins structures (132, 134, 136) and the second control gate 141 is formed over the second pattern of semiconductor fin structures (131, 133, 135). As further shown in FIG. 1A, the first and second patterns of semiconductor fin structures are formed such that end portions of the first pattern of semiconductor fin structures (132, 134, 136) partially overlap, and are interdigitated with, end portions of the second pattern of semiconductor fin structures (131, 133, 135).

Moreover, as shown in FIGS. 1A and 1B, one or more overlapping end portions of the semiconductor fin structures are separated by a distance D1, and one or more overlapping end portions of the semiconductor fin structures are separated by a distance D2, wherein D2>D1. In the exemplary embodiment of FIGS. 1A and 1B, there are three (3) pairs of semiconductor fin structures which have overlapping end portions separated by the distance D1. In particular, the semiconductor fin structures 131 and 132 form a first fin structure pair 131/132, the semiconductor fin structures 133 and 134 form a second fin structure pair 133/134, and the semiconductor fin structures 135 and 136 form a third fin structure pair 135/136.

As further shown in FIGS. 1A and 1B, source structures s1, s2, s3, s4, s5, and s6, and drain structures d1, d2, d3, d4, d5, and d6 are formed on exposed portions of the semiconductor fin structures 131, 132, 133, 134, 135, and 136, which are not covered by the first and second control gates 140 and 141. In one embodiment of the invention, the source structures s1~s6 and drain structures d1~d6 are grown using an epitaxy process in which a semiconductor layer, such as a silicon germanium layer, is epitaxially grown on the exposed portions of the semiconductor fin structures using known techniques. As shown in FIG. 1B, a source/drain epitaxy process will form faceted source structures s1~s6 and drain structures d1~d6 (e.g., diamond-shaped or trapezoidal-shaped source/drain structures) on the exposed portions of the semiconductor fin structures 131, 132, 133, 134, 135, and 136.

During the epitaxy process in which the source structures s1~s6 and drain structures d1~d6 are epitaxially grown, a merging between source and drain structures may occur (or may not occur), such that formation of the source and drain structures on the overlapping end portions of the semiconductor fin structures which are separated by the distance D1, results in a random pattern of merged and non-merged source and drain structures. The random pattern of merged and non-merged source and drain structures provides a random pattern of electrical open and short connections between the pairs of semiconductor fin structures (i.e., the fin structure pairs) which have overlapping end portions separated by the distance D1. The random pattern of electrical open and short connections between the pairs of semiconductor fin structures implements a PUF structure.

For example, as shown in FIGS. 1A and 1B, an epitaxial process results in a merging of the drain structure d1 and the source structure s2, which are formed on the overlapping end portions of the fin structure pair 131/132 (separated by the distance D1), as well a merging of the drain structure d5 and the source structure s6, which are formed on the overlapping portions of the fin structure pair 135/136 (separated by the distance D1). While the overlapping end portions of the semiconductor fin structures 133 and 134 (fin structure pair 133/134) are separated by the distance D1, the epitaxial process does not result in a merging of the drain structure d3 and the source structure s4.

In this regard, the semiconductor structure 100 of FIGS. 1A and 1B implements a physical unclonable function based on randomness in the merging of epitaxial source/drain structures formed on the overlapping end portions of the fin structure pairs, resulting in a random pattern of electrical open/short connections. In particular, in accordance with embodiments of the invention, a PUF structure is realized based on a process-induced variation in the epitaxial growth of source/drain structures on semiconductor fin structures of FinFET devices, resulting in randomness in electrical open/short connections between fin structure pairs (e.g., fin structure pairs 131/132, 133/134, and 135/136).

In one embodiment of the invention, the values for D1 and D2 are selected based on a relation D2>D>D1, wherein D denotes a value of a "spacing rule" of a design rule that is implemented to fabricate the semiconductor device. As is known in the art, a "spacing rule" of a design rule specifies a minimum distance between two adjacent features for a given semiconductor design process. The distance D1 is selected so that the merging (shorting) of drain and source structures formed on the overlapping end portions of the semiconductor fin structure pairs is random across portions of a given die and across different dies of wafer. In addition, the distance D1 is selected (via actual experimentation and/or computer simulation) so that a percentage of merged source and drain structures, which are formed between the pairs of semiconductor fin structures that have overlapping end portions separated by the distance D1, is within a range of about 30% to about 70%.

Moreover, the value D2 is selected so that no merging exists between the source and drain structures formed on the overlapping end portions of semiconductor fin structures that are separated by the distance D2. In other words, the value of D2 is selected so that D2 is beyond the merge limit for the given fabrication process. For example, as shown in FIGS. 1A and 1B, there is no merging between (i) the source structure s2 and drain structure d3 formed on the overlapping end portions of the semiconductor fin structures 132 and 133, or (ii) the source structure s4 and drain structure d5 formed on the overlapping end portions of the semiconductor fin structures 134 and 135.

It is to be appreciated that FinFET-based PUF structures according to embodiments of the invention, can be fabricated for "free", because the PUF structures can be fabricated simultaneously with regular FinFET structures without the need for extra mask formation steps or additional fabrication steps to form the PUF structures. In other words, the FinFET PUF structures and regular FinFET structures for a given integrated circuit design can be fabricated at the same time using the same etch masks and fabrication steps. Moreover, as noted above, the fabrication process can be tuned with regard to the values of D1 and D2 for a given spacing rule D of the associated design rule, so as to obtain FinFET PUF structures having the same or a similar target percentage of epi merge (electrical short) between pairs of semiconductor fin structures with the same D1 spacing over different regions of a given die and across dies of a given wafer, while ensuring that the locations of the epi merge in different FinFET PUF structures formed on a given die and formed across different dies is completely random and not duplicable.

As further shown in FIGS. 1A and 1B, contact terminals (1, 1', 2, 2', 3, and 3') are connected to the source structures s1, s3, and s5, and the drain structures d2, d4, and d6 formed on the non-overlapping end portions of the semiconductor fin structures 131, 132, 133, 134, 135 and 136. A readout circuit can be connected to the contact terminals (1, 1', 2, 2', 3, and 3') to readout a random code provided by the PUF structure 100.

Figure 2:
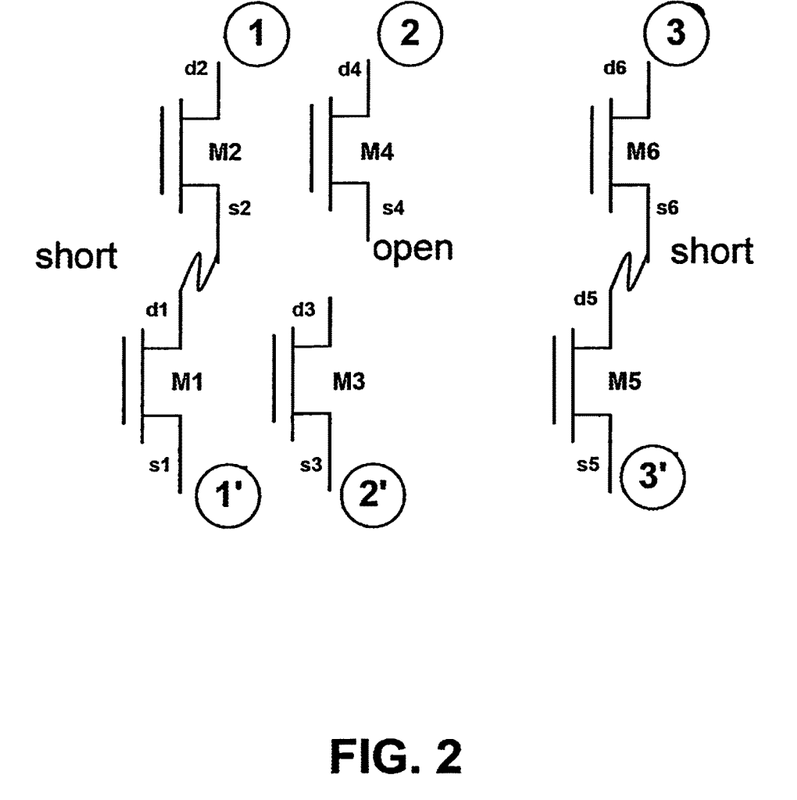
FIG. 2 is a schematic circuit diagram that depicts a circuit equivalent of the physical unclonable function implemented by the semiconductor structure of FIGS. 1A/1B, according to an embodiment of the invention.

FIG. 2 is a schematic circuit diagram that depicts a circuit equivalent of the physical unclonable function implemented by the semiconductor structure 100 of FIGS. 1A/1B, according to an embodiment of the invention. FIG. 2 schematically illustrates a plurality of FET devices M1, M2, M3, M4, M5, and M6 which are realized by the semiconductor structure 100 shown in FIG. 1A. For example, the FET device M1 corresponds to the semiconductor fin structure 131, the control gate 141, and the source/drain structures s1/d1, as shown in FIG. 1A. The FET device M2 corresponds to the semiconductor fin structure 132, the control gate 140, and the source/drain structures s2/d2, as shown in FIG. 1A. The FET device M3 corresponds to the semiconductor fin structure 133, the control gate 141, and the source/drain structures s3/d3, as shown in FIG. 1A. The FET device M4 corresponds to the semiconductor fin structure 134, the control gate 140, and the source/drain structures s4/d4, as shown in FIG. 1A. The FET device M5 corresponds to the semiconductor fin structure 135, the control gate 141, and the source/drain structures s5/d5, as shown in FIG. 1A. The FET device M6 corresponds to the semiconductor fin structure 136, the control gate 140, and the source/drain structures s6/d6, as shown in FIG. 1A.

In addition, the schematic circuit diagram of FIG. 2 shows (i) the electrical shorting between terminals 1 and 1' due to the epitaxial merging of the drain d1 and source s2 structures of the respective FETs M1 and M2, (ii) the electrical open between terminals 2 and 2' due to the non-merging of the drain d3 and source s4 structures of the respective FETs M3 and M4, and (iii) the electrical shorting between terminals 3 and 3' due to the epitaxial merging of the drain d5 and source s6 structures of the respective FETs M5 and M6.

In the circuit diagram of FIG. 2, a readout circuit can be connected to the contact terminals (1, 1', 2, 2', 3, and 3') to determine a "random code" of the PUF structure when the devices M1, M2, M3, M4, M5 and M6 are activated (e.g., control voltage applied to the control gates 140 and 142 in FIG. 1A). The random code that is provided by the PUF structure is based on random pattern of electrical opens and electrical shorts that are generated as a result of the randomness in the epitaxial merging of source and drain structures between pairs of FinFET devices. A readout circuit and method for determining a random code of a FinFET-based PUF structure according to an embodiment of the invention will be discussed in further detail below with reference to FIG. 9, for example.

Figure 3:
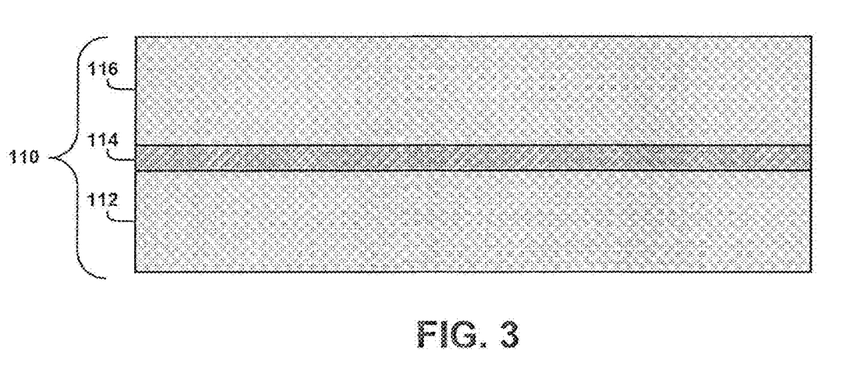
FIG. 3 is a cross-sectional view of the semiconductor structure at an initial stage of fabrication starting with silicon-on-insulator (SOI) semiconductor substrate, according to an embodiment of the invention.

FIGS. 3, 4, 5A, 5B, 6A, 6B, 7A, and 7B schematically illustrate a method for fabricating the semiconductor structure of FIGS. 1A/1B, according to an embodiment of the invention. FIG. 3 is a cross-sectional view of the semiconductor structure at an initial stage of fabrication starting with silicon-on-insulator (SOI) semiconductor substrate 110 according to an embodiment of the invention. As shown in FIG. 3, the substrate 110 comprises a base substrate layer 112, an insulating layer 114 (e.g., buried oxide layer) and an active semiconductor layer 116 (or SOI layer 116). The insulating layer 114 isolates the active semiconductor layer 116 from the base substrate 112. The base substrate 112 may be made from any of several known semiconductor materials such as, for example, silicon, germanium, silicon-germanium alloy, silicon carbide, silicon-germanium carbide alloy, and compound (e.g. III-V and II-VI) semiconductor materials. Non-limiting examples of compound semiconductor materials include gallium arsenide, indium arsenide, and indium phosphide. The thickness of the base substrate 112 will vary depending on the application.

The insulating layer 114 may be formed of any dielectric or insulating material which is suitable for the given application. For example, the insulating layer 114 may be formed of material such as, for example, oxides, nitrides, oxynitrides of silicon, and combinations thereof. In addition, the insulating layer 114 may include crystalline or non-crystalline dielectric material. In one embodiment, the insulating layer 114 has a thickness in a range of about 100 nm to about 500 nm, for example.

The SOI layer 116 may be made of silicon or other suitable types of semiconductor materials, such as materials used for the base substrate 112. In general, the base substrate 112 and the SOI layer 116 may include either identical or different semiconducting materials with respect to chemical composition, dopant concentration and crystallographic orientation. The SOI layer 116 may be doped with p-type dopants such as boron or doped with n-type dopants such as phosphorus and/or arsenic. The SOI layer 116 may have a thickness ranging from approximately 10 nm to about 100 nm, for example. In one embodiment of the invention, the target thickness of the SOI layer 116 will be selected based on the desired thickness (or height) of the semiconductor fin structures for the FinFET devices.

In another embodiment of the invention, semiconductor FinFET devices can be fabricated using a bulk FinFET process, wherein semiconductor fin structures are formed in bulk silicon, and an insulating oxide material (e.g., $SiO_2$) is deposited in the trenches between the semiconductor fin structures. The insulating oxide material is then etched back to expose some portion of the semiconductor fin structures, thus defining a baseline active fin height.

In an embodiment using the SOI substrate 110 as shown in FIG. 3, semiconductor fin structures are formed, in part, by selectively etching the SOI layer 116 (e.g., silicon layer) down to the insulating layer 114 (e.g., buried oxide layer) using a photolithographic process. In this process, the active fin heights are set by the thickness of the SOI layer 116, which enables precise control, and less variation, of the active fin height as compared to the bulk FinFET process.

Figure 4:
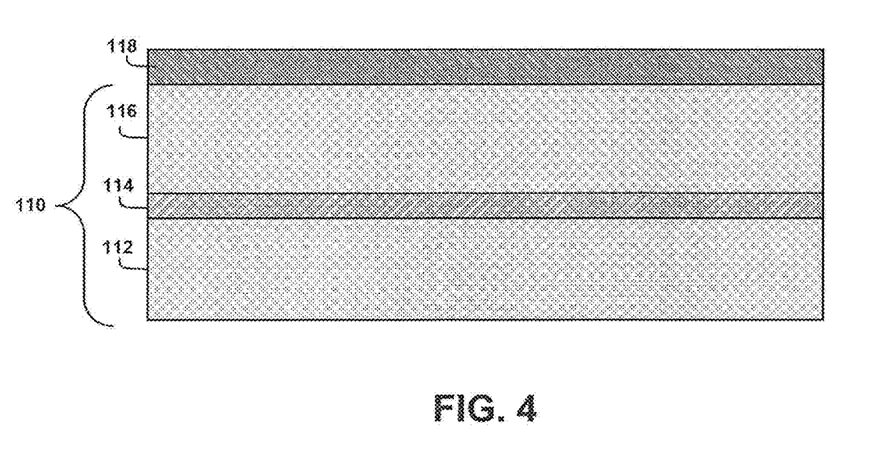
FIG. 4 is a cross-sectional view of the semiconductor structure after forming a nitride layer on an SOI layer of the semiconductor substrate, according to an embodiment of the invention.

A first step in one exemplary process for fabricating semiconductor fin structures is to form a hard mask that is used for etching the SOI layer 116. FIG. 4 is a cross-sectional view of the semiconductor structure of FIG. 3 after forming a nitride layer 118 on the SOI layer 116, according to an embodiment of the invention. In one embodiment of the invention, the nitride layer 118 is formed with a thickness in a range of about 5 nm to about 15 nm. The nitride layer 118 is then patterned using a photolithographic process, for example, where a layer of photoresist material is deposited on top of the nitride layer 118 and lithographically patterned (exposed and developed) to form a photoresist mask having a target pattern which defines a hard mask pattern and corresponding semiconductor fin pattern to be transferred to the semiconductor layer 116. An etch process is then performed using the photoresist mask to etch exposed portions of the nitride layer 118 down to the semiconductor layer 116 to form a hard mask. The nitride etch process can be performed using a dry etch process such as RIE (reactive ion etching) or other anisotropic etch processes with etching chemistries that are suitable to etch the nitride layer 118.

Figure 5A:
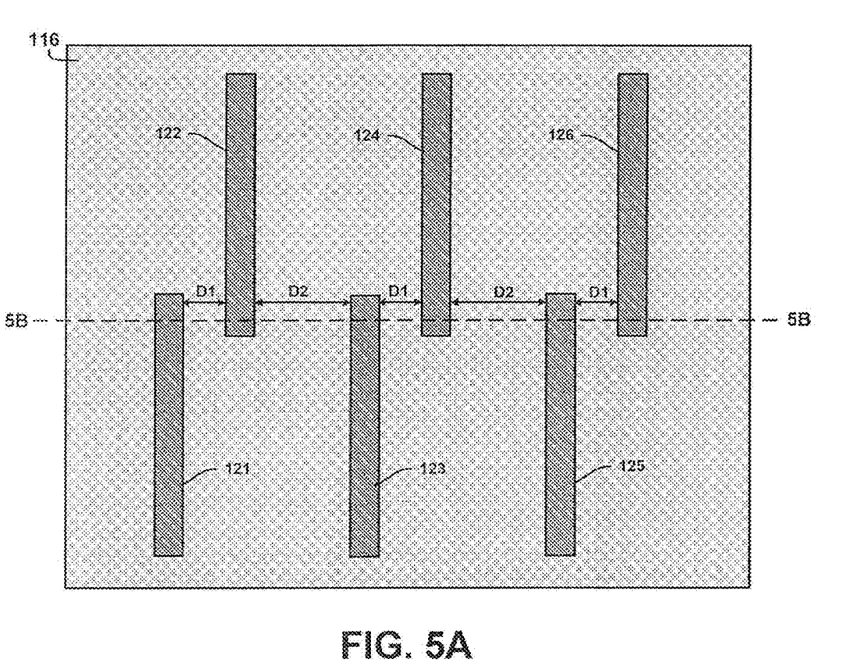
FIG. 5A is a top plan schematic view of the semiconductor structure.
Figure 5B:
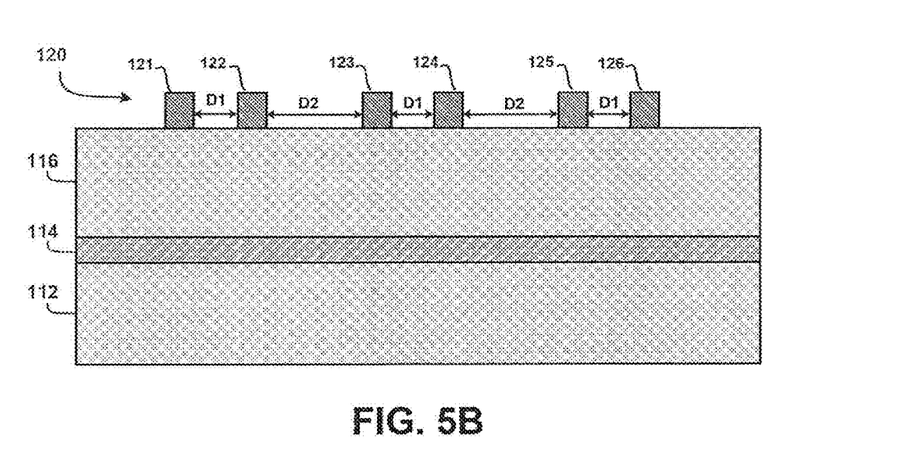
FIG. 5B is a cross-sectional schematic view of the semiconductor structure taken along line 5B-5B in FIG. 5A.

FIGS. 5A and 5B are schematic views of the semiconductor structure of FIG. 4 after patterning the nitride layer 118 to form a hard mask pattern 120, according to an embodiment of the invention. FIG. 5A is a top plan schematic view of the semiconductor structure showing the hard mask pattern 120 comprising a plurality of hard mask structures 121, 122, 123, 124, 125, and 126. FIG. 5B is a cross-sectional schematic view of the semiconductor structure taken along line 5B-5B in FIG. 5A. As shown in FIG. 5A, the hard mask structures 121, 122, 123, 124, 125, and 126 define the layout of the semiconductor fin structures of the FinFET devices, and have width and lengths that define the width and length of the semiconductor fin structures.

As shown in FIGS. 5A and 5B, end portions of the hard mask structures 121, 123 and 125 partially overlap, and are interdigitated with, end portions of the hard mask structures 122, 124, and 126. As further shown, the overlapping ends of the adjacent pairs of hard mask structures 121/122, 123/124, and 125/126 are separated by a distance D1, while the overlapping ends of the adjacent hard mask structures 122/123, and 124/125 are separated by a distance D2. As noted above, assuming the ground rule implemented for the given fabrication process is D (e.g., 14 nm node), the values of D, D1 and D2 are related as follows: D2>D>D1.

Figure 6A:
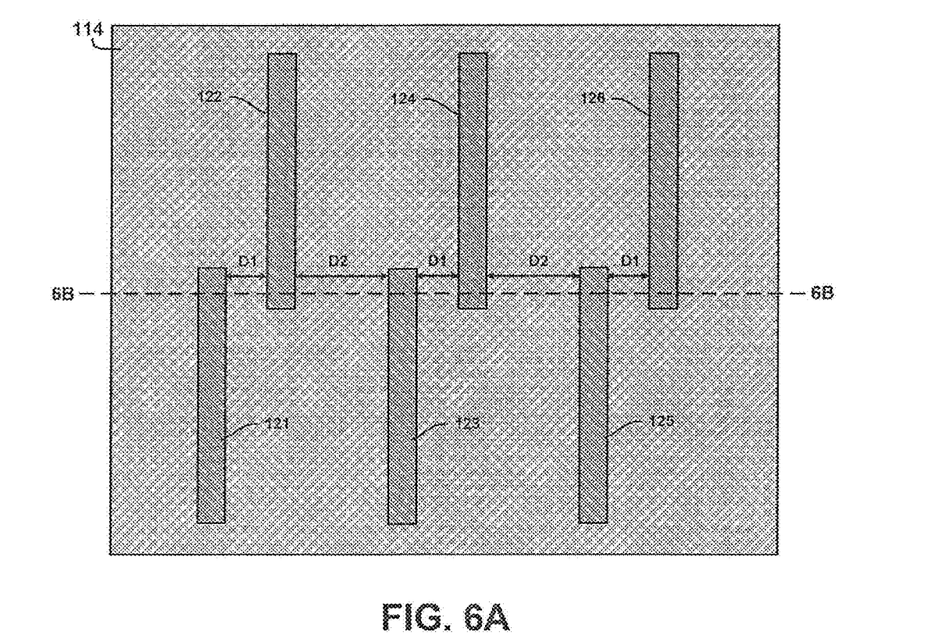
Figure 6B:
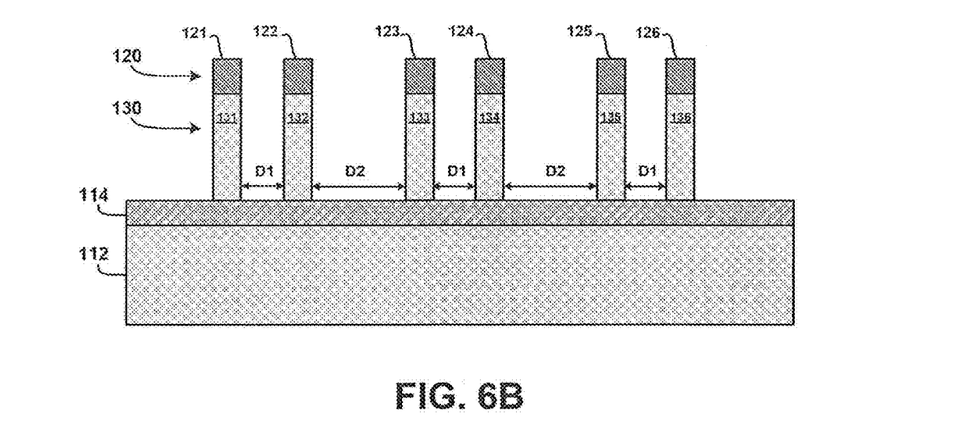
FIG. 6B is a cross-sectional schematic view of the semiconductor structure taken along line 6B-6B in FIG. 6A.

A next step in the exemplary fabrication process comprises patterning the SOI layer 116 using the hard mask pattern 120 to form a plurality of semiconductor fin structures 130. FIGS. 6A and 6B are schematic views of the semiconductor structure shown in FIGS. 5A and 5B, respectively, after patterning the SOI layer 116 using the hard mask structures 121, 122, 123, 124, 125, and 126 to form corresponding semiconductor fin structures 131, 132, 133, 134, 135, and 136. FIG. 6A is a top plan schematic view of the semiconductor structure showing the removal of the portion of the SOI layer 116 not covered by the hard mask structures 121, 122, 123, 124, 125, and 126. In addition, FIG. 6B is a cross-sectional schematic view of the semiconductor structure taken along line 6B-6B in FIG. 6A showing the plurality of semiconductor fin structures 131, 132, 133, 134, 135, and 136, which are formed by etching the SOI layer 116 down to the insulating layer 114 using the pattern of the respective hard mask structures 121, 122, 123, 124, 125, and 126. In one embodiment of the invention, the SOI layer 116 may be etched using an anisotropic etch process such as reactive ion etching (RIE) or plasma etching process which is selective to the nitride material of the hard mask pattern 120

It is to be understood the semiconductor fin structures 131, 132, 133, 134, 135, and 136 are formed to have a width and height which is suitable for the given application. In addition, as noted above, the distance values D1 and D2 between the semiconductor fin structures 131, 132, 133, 134, 135, and 136 are selected based on the "spacing rule" of a design rule used in the semiconductor fabrication process, wherein a spacing rule D specifies the minimum distance between two adjacent objects. As noted above, the values of D1 and D2 are related to D as follows: D2>D>D1.

It is to be understood that for ease of illustration and explanation, the example embodiments discussed herein show the first and second patterns of semiconductor fin structures each having three semiconductor fin structures, which provide three pairs of semiconductor fin structures which have overlapping end portions separated by the distance D1 (e.g., semiconductor fin structure pair 131/132, semiconductor fin structure pair 133/134, and semiconductor fin structure pair 135/136). However, FinFET-based PUF structures according to embodiments of the invention have many more than three pairs of semiconductor fin structures.

Figure 7A:
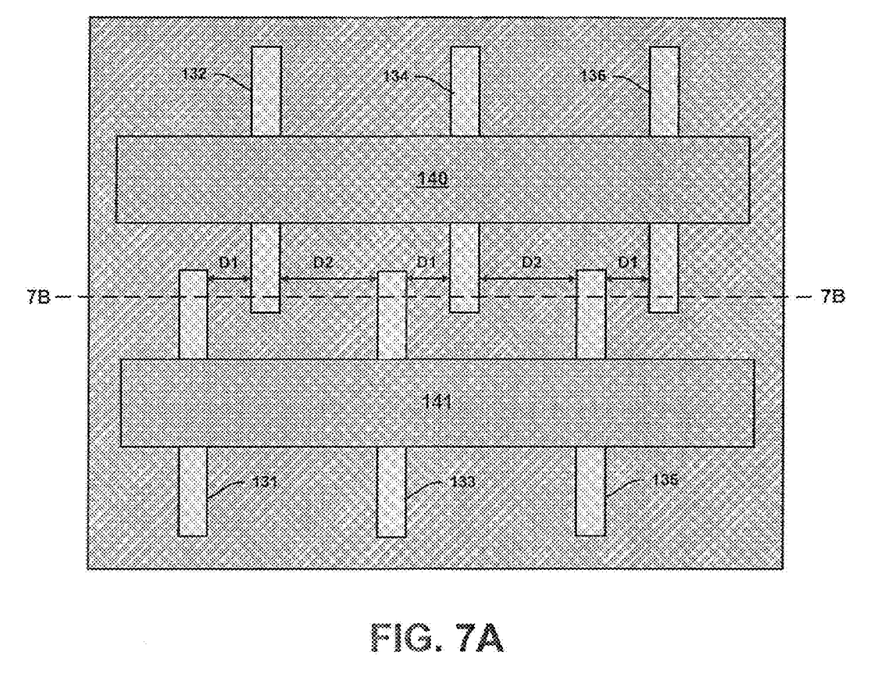
Figure 7B:
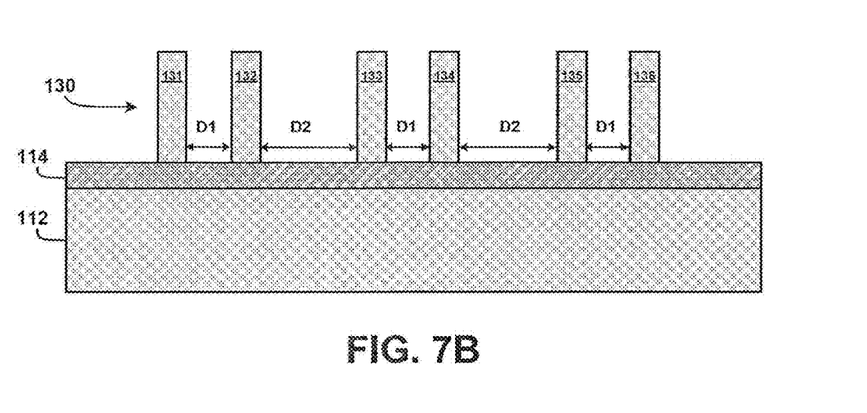
FIG. 7B is a cross-sectional schematic view of the semiconductor structure taken along line 7B-7B in FIG. 7A.

A next step in the exemplary process is to remove the hard mask pattern 120 and form control gate structures for the FinFET devices. FIGS. 7A and 7B are schematic views of the semiconductor structures shown in FIGS. 6A and 6B, respectively, after removing the hard mask structures 121, 122, 123, 124, 125, and 126 from the top surfaces of the respective semiconductor fin structures 131, 132, 133, 134, 135, and 136, and forming the control gate structures 140 and 141 over the semiconductor fin structures, according to an embodiment of the invention.

FIG. 7A is a top plan schematic view of the semiconductor structure showing the control gate structure 140 formed over the pattern of semiconductor fin structures 132, 134 and 136 in a direction that is orthogonal to the length direction of the semiconductor fin structures 132, 132, and 136. Similarly, FIG. 7A shows the control gate structure 141 formed over the pattern of semiconductor fin structures 131, 133 and 135 in a direction that is orthogonal to the length direction of the semiconductor fin structures 131, 133, and 135. FIG. 7B is a cross-sectional schematic view of the semiconductor structure taken along line 7B-7B in FIG. 7A showing the spacing D1 and D2 between the semiconductor fin structures 131, 132, 133, 134, 135 and 136.

Depending on the desired application, the control gate structures 140 and 141 can be formed using a "gate-first" process wherein a gate stack and spacers are formed prior to a selective epitaxial growth process in which source and drain structures are grown on the portions of the semiconductor fins extending from the sidewalls of the control gate structures 140 and 141. In a "gate-first" process, the control gate structures 140 and 141 may be formed by depositing a conformal gate dielectric layer over the semiconductor fin structures, depositing a metallic gate layer over the gate dielectric layer, depositing a dielectric/insulating layer over the metallic gate layer, and then performing an etch process to pattern the gate structures 140 and 141.

In another embodiment, the control gate structures 140 and 141 of the FinFETs can be formed using a "gate-last" process which involves, for example, forming dummy gate structures (e.g., polysilicon gates), fabricating other elements of the FinFET structures, removing the dummy gate structures, and replacing the removed dummy gate with actual gate materials. With this process, for example, the gate structures 140 and 141 would be dummy gate structures formed of polysilicon, for example. The dummy gate structures are sacrificial structures that are subsequently removed and replaced by a replacement metal gate (RMG) potentially including a gate dielectric layer, a work function metal layer, and a metal electrode. Because the RMG structures are formed after the other components of the FinFET devices are formed, the RMG structures are not subjected to various potentially damaging processing steps, for example high-temperature anneals.

Figure 8A:
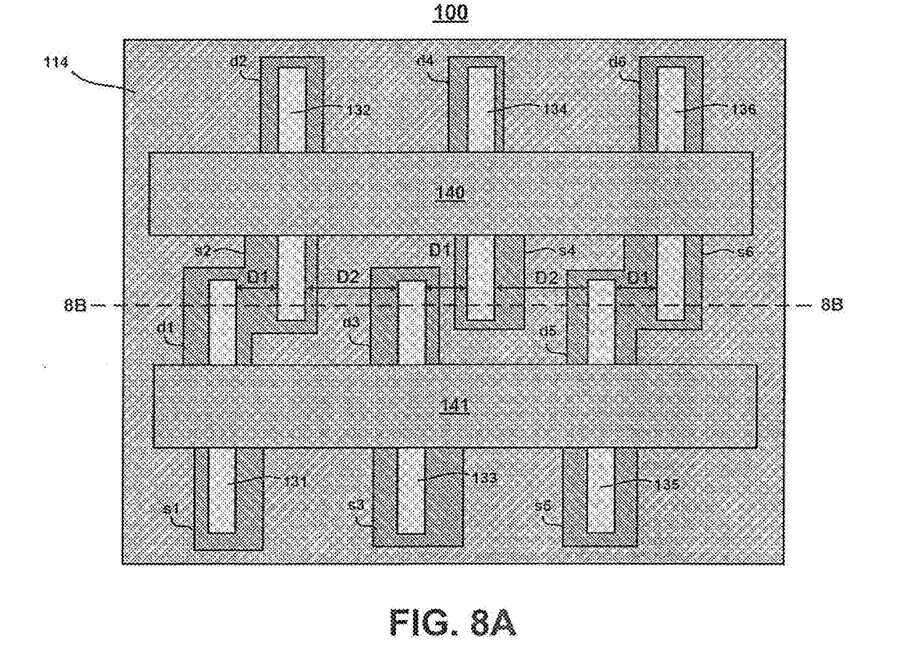
Figure 8B:
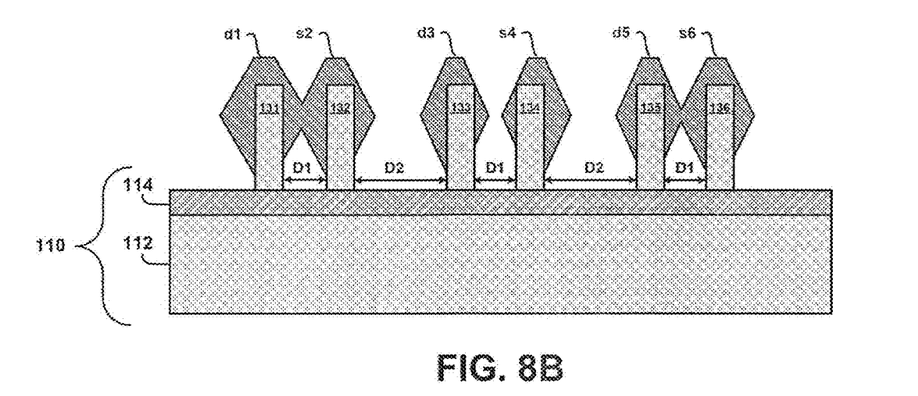
FIG. 8B is a cross-sectional schematic view of the semiconductor structure taken along line 8B-8B in FIG. 8A.

The dummy gate structures can be formed using various techniques known in the art. For example, in one embodiment of the invention, the dummy gate structures are formed of sacrificial material such as polysilicon, although in other embodiments of the invention, the dummy gate structures may be made of, e.g., an amorphous or polycrystalline silicon material. The material used to form the dummy gate structures can be deposited using any suitable deposition technique known in the art, including atomic layer deposition (ALD), chemical vapor deposition (CVD), physical vapor deposition (PVD), or molecular beam deposition (MBD), for example. Thereafter, the deposited sacrificial gate material is patterned (via a suitable lithographic process and etch process) to form the dummy gate structures. After formation of the dummy gate structures, several deposition and etching processes are performed to form a gate insulating layer over the dummy gate structures, wherein the gate insulating layer comprises vertical spacers formed on the sidewalls of the dummy gate structures and a capping layer formed on the top surface of the dummy gate structure, A next step in the exemplary process is to form source and drain structures on the exposed portions of the semiconductor fin structures 131, 132, 133, 134, 135, and 136 that are not covered by the control gates 140 and 141. For example, FIGS. 8A and 8B are schematic views of the semiconductor structure after performing a source/drain epitaxy process to form source and drain structures, according to an embodiment of the invention. In particular, FIG. 8A is a top plan view of the semiconductor structure shown in FIG. 7A after growing source structures s1, s2, s3, s4, s5, and s6, and drain structures d1, d2, d3, d4, d5, and d6 on the end portions of the respective semiconductor fin structures 131, 132, 133, 134, 135, and 136. FIG. 8B is a cross-sectional schematic view of the semiconductor structure taken along line 8B-8B in FIG. 8A.

In one embodiment of the invention, the source structures s1~s6 and drain structures d1~d6 are grown using an epitaxy process in which a semiconductor layer, such as a silicon germanium layer, is epitaxially grown on the exposed portions of the semiconductor fin structures using known techniques. As depicted in FIG. 8B, a source/drain epitaxy process will form faceted source structures s1~s6 and drain structures d1~d6 (e.g., diamond-shaped or trapezoidal-shaped source/drain structures) on the exposed portions of the semiconductor fin structures 131, 132, 133, 134, 135, and 136. As noted above, during the epitaxy process in which the source structures s1~s6 and drain structures d1~d6 are epitaxially grown, a merging between source and drain structures may occur (or may not occur), such that formation of the source and drain structures on the overlapping end portions of the semiconductor fin structures which are separated by the distance D1, results in a random pattern of merged and non-merged source and drain structures.

For example, as shown in FIG. 8B, an epitaxial process results in a merging of the drain structure d1 and the source structure s2 that are formed on the overlapping portions of the respective semiconductor fin structures 131 and 132 (separated by the distance D1), as well a merging of the drain structure d5 and the source structure s6 that are formed on the overlapping portions of the respective semiconductor fin structures 135 and 136 (separated by the distance D1). While the overlapping portions of the semiconductor fin structures 133 and 134 are separated by the distance D1, the epitaxial process does not result in a merging of the drain structure d3 and the source structure s4 that are formed on the respective overlapping portions of the respective semiconductor fin structures 133 and 134.

Again, while the distance D1 is less that the "spacing rule" D for the technology node of the applied process, the epitaxial merging (shorting) of the drain/source structures, which occurs between overlapping end portions of the semiconductor fins structures which are separated by the distance D1, is random across portions of given die and across different dies of wafer. This randomness in the epitaxial merging implements a random function of the FinFET-based PUF structure.

Figure 9:
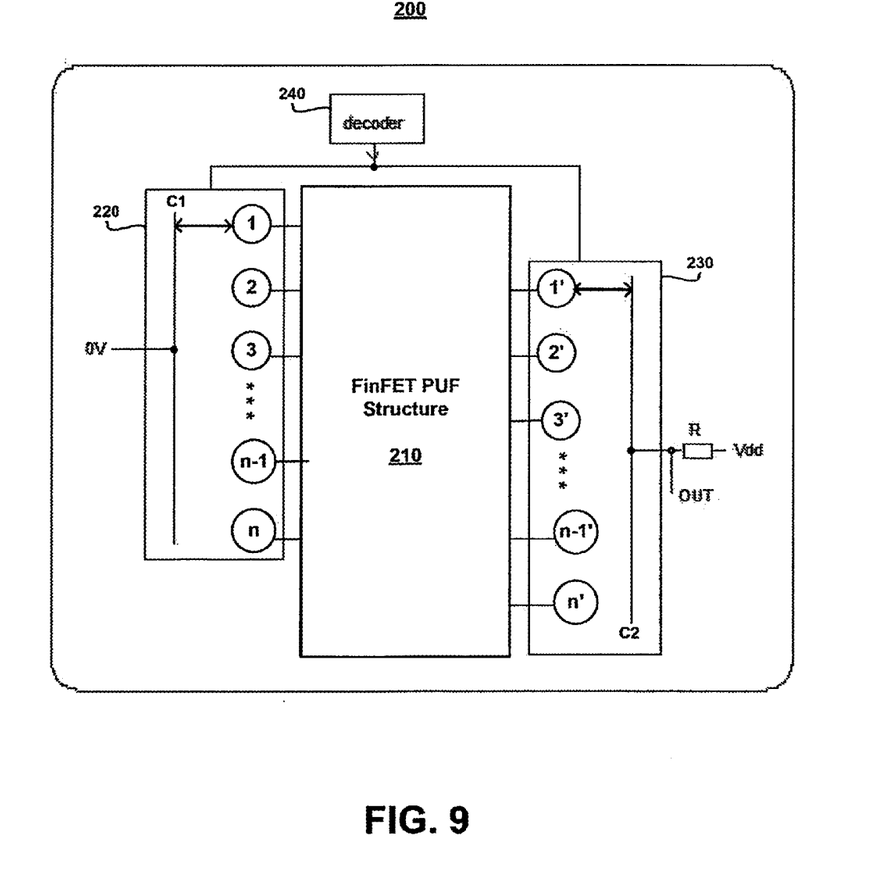
FIG. 9 shows a schematic circuit diagram of a circuit to read out a random code of a physical unclonable function implemented by a semiconductor FinFET structure according to an embodiment of the present invention.

FIG. 9 schematically illustrates a circuit 200 for reading out a code of a physical unclonable function implemented by a semiconductor FinFET structure, according to an embodiment of the present invention. The circuit 200 comprises a FinFET PUF structure 210, a first multiplexer circuit 220, a second multiplexer circuit 230, and a decoder circuit 240. In one embodiment, the FinFET PUF structure 210 is based on the structure discussed above with regard to FIGS. 1A/1B, for example. The FinFET PUF structure 210 comprises a plurality (n) of input terminals (1, 2, 3, . . . , n−1, n), and a plurality (n') of output terminal (1', 2', 3', . . . , n−1', n').

The first multiplexer circuit 220 comprises a 1×(n) multiplexer having a common terminal C1 that is switchably connected to one of the input terminals (1, 2, 3, . . . , n−1, n) of the FinFET PUF structure 210 under the control of the decoder 240. The common terminal C1 of the first multiplexer circuit 220 is connected to a first voltage source (e.g., ground) of 0V. Likewise, the second multiplexer circuit 230 comprises 1×(n') multiplexer having a common terminal C2 that is switchably connected to one of the output terminal (1', 2', 3', . . . , n−1', n') of the FinFET PUF structure 210 under control of the decoder 240. The common terminal C2 of the second multiplexer circuit 230 is connected to a second voltage source Vdd through a resistor R, and connected to an output node OUT.

To read out the code of the FinFET PUF structure 210, the control gates of the FinFET PUF structure 210 (e.g., control gates 140 and 141 in FIG. 1A/1B) are activated, and the input terminals (1, 2, 3, . . . , n−1, n) of the FinFET PUF structure 210 are sequentially connected to the common terminal C1 by a switching operation of the first multiplexer 220 under the control of the decoder 240, thereby causing the input terminals (1, 2, 3, . . . , n−1, n) of the FinFET PUF structure 210 to be sequentially connected to 0V. At the same time, the output terminals (1', 2', 3', . . . , n−1', n') of the FinFET PUF structure 210 are sequentially connected to the common terminal C2 by a switching operation of the second multiplexer 230 under the control of the decoder 240, thereby causing the output terminals (1', 2', 3', . . . , n−1', n') of the FinFET PUF structure 210 to be sequentially connected to the output node OUT.

When an electrical connection (short) exists in the FinFET PUF structure 210 between corresponding input and output terminals (e.g., between input and output terminals 1 and 1'), the voltage on the output node OUT will be 0V. On the other hand, when an electrical connection does not exist (open) in the FinFET PUF structure 210 between corresponding input and output terminals (e.g., between input and output terminals 1 and 1'), the voltage on the output node OUT will be Vdd. In this manner, the readout circuit 200 will generate a sequence of 1 and 0s at the output node OUT, which represents the random function of the FinFET PUF structure 210.

It is to be understood that the methods discussed herein for fabricating FinFET-based PUF structures can be incorporated within semiconductor processing flows for fabricating other types of semiconductor devices and integrated circuits with various analog and digital circuitry or mixed-signal circuitry for providing on-chip security applications. In particular, integrated circuit dies can be fabricated with such PUF structures along with various devices such as field-effect transistors, bipolar transistors, metal-oxide-semiconductor transistors, diodes, capacitors, inductors, etc. An integrated circuit in accordance with the present invention can be employed in applications, hardware, and/or electronic systems. Suitable hardware and systems for implementing the invention may include, but are not limited to, personal computers, communication networks, electronic commerce systems, portable communications devices (e.g., cell phones), solid-state media storage devices, functional circuitry, etc. Systems and hardware incorporating such integrated circuits are considered part of the embodiments described herein. Given the teachings of the invention provided herein, one of ordinary skill in the art will be able to contemplate other implementations and applications of the techniques of the invention.

Although exemplary embodiments have been described herein with reference to the accompanying figures, it is to be understood that the invention is not limited to those precise embodiments, and that various other changes and modifications may be made therein by one skilled in the art without departing from the scope of the appended claims.

What is claimed is:

1. A method for fabricating a semiconductor device, comprising:
    forming a plurality of semiconductor fin structures on a substrate, wherein the semiconductor fin structures comprise a first pattern and a second pattern of semiconductor fin structures, wherein end portions of the first pattern of semiconductor fin structures partially overlap, and are interdigitated with, end portions of the second pattern of semiconductor fin structures, wherein one or more overlapping end portions of the semiconductor fin structures are separated by a distance D1, and wherein one or more overlapping end portions of the semiconductor fin structures are separated by a distance D2, wherein D2>D1;
    forming a first control gate over the first pattern of semiconductor fins structures;
    forming a second control gate over the second pattern of semiconductor fin structures; and
    epitaxially growing semiconductor layers on the end portions of the semiconductor fin structures to form source and drain structures;
    wherein the distance D1 is selected so that the step of epitaxially growing semiconductor layers on the end portions of the semiconductor fin structures results in a random pattern of merged and non-merged source and drain structures formed on the overlapping end portions of the semiconductor fin structures which are separated by the distance D1; and
    wherein the random pattern of merged and non-merged source and drain structures provides a random pattern of electrical open and short connections between pairs of semiconductor fin structures which have overlapping end portions separated by the distance D1, wherein the random pattern of electrical open and short connections between pairs of semiconductor fin structures implements a PUF (physical unclonable function) structure.

2. The method of claim 1, wherein the distance D2 is selected so that no merging occurs between the source and drain structures that are formed on the overlapping end portions of semiconductor fin structures separated by the distance D2 as a result of the epitaxially growing step.

3. The method of claim 2, wherein D2>D>D1, and wherein D denotes a spacing rule of a design rule that is implemented for fabricating the semiconductor device.

4. The method of claim 1, wherein the distance D1 is selected so that a percentage of merged source and drain structures, which arc formed between the pairs of semiconductor fin structures that have overlapping end portions separated by the distance D1, is within a range of about 30% to about 70%.

5. The method of claim 1, further comprising forming contact terminals to the source and drain structures formed on non-overlapping end portions of the semiconductor fin structures.

6. The method of claim 1, further comprising connecting a readout circuit to the contact terminals to readout a random code provided by the PUF structure.

7. A semiconductor device, comprising:
a plurality of semiconductor fin structures formed on a substrate, wherein the semiconductor fin structures comprise a first pattern and a second pattern of semiconductor fin structures, wherein end portions of the first pattern of semiconductor fin structures partially overlap, and are interdigitated with, end portions of the second pattern of semiconductor fin structures, wherein one or more overlapping end portions of the semiconductor fin structures are separated by a distance D1, and wherein one or more overlapping end portions of the semiconductor fin structures are separated by a distance D2, wherein D2>D1;
a first control gate formed over the first pattern of semiconductor fins structures;
a second control gate formed over the second pattern of semiconductor fin structures; and
source and drain structures epitaxially grown on the end portions of the semiconductor fin structures;
wherein the source and drain structures, which are formed on the overlapping end portions of the semiconductor fin structures which are separated by the distance D1, comprises a random pattern of merged and non-merged source and drain structures;
wherein the random pattern of merged and non-merged source and drain structures provides a random pattern of electrical open and short connections between pairs of semiconductor fin structures which have overlapping end portions separated by the distance D1; and
wherein the random pattern of electrical open and short connections between pairs of semiconductor fin structures implements a PUF (physical unclonable function) structure.

8. The device of claim 7, wherein no merging exists between the source and drain structures formed on the overlapping end portions of semiconductor fin structures separated by the distance D2.

9. The device of claim 8, wherein D2>D>D1, and wherein D denotes a spacing rule of a design rule that is implemented to fabricate the semiconductor device.

10. The device of claim 7, wherein the distance D1 is selected so that a percentage of merged source and drain structures, which are formed between the pairs of semiconductor fin structures that have overlapping end portions separated by the distance D1, is within a range of about 30% to about 70%.

11. The device of claim 7, further comprising contact terminals connected to the source and drain structures formed on non-overlapping end portions of the semiconductor fin structures.

12. The device of claim 7, further comprising a readout circuit connected to the contact terminals to readout a random code provided by the PUF structure.

13. An integrated circuit chip, comprising:
a substrate; and
a PUF (physical unclonable function) structure formed on the substrate, wherein the PUF structure comprises:
a plurality of semiconductor fin structures, wherein the semiconductor fin structures comprise a first pattern and a second pattern of semiconductor fin structures, wherein end portions of the first pattern of semiconductor fin structures partially overlap, and are interdigitated with, end portions of the second pattern of semiconductor fin structures, wherein one or more overlapping end portions of the semiconductor fin structures are separated by a distance D1, and wherein one or more overlapping end portions of the semiconductor fin structures are separated by a distance D2, wherein D2>D1;
a first control gate formed over the first pattern of semiconductor fins structures;
a second control gate formed over the second pattern of semiconductor fin structures;
source and drain structures epitaxially grown on the end portions of the semiconductor fin structures; and
contact terminals connected to the source and drain structures formed on non-overlapping end portions of the semiconductor fin structures;
wherein the source and drain structures, which are formed on the overlapping end portions of the semiconductor fin structures which are separated by the distance D1, comprises a random pattern of merged and non-merged source and drain structures;
wherein the random pattern of merged and non-merged source and drain structures provides a random pattern of electrical open and short connections between pairs of semiconductor fin structures which have overlapping end portions separated by the distance D1.

14. The integrated circuit chip of claim 13, wherein no merging exists between the source and drain structures formed on the overlapping end portions of semiconductor fin structures separated by the distance D2.

15. The integrated circuit chip of claim 14, wherein D2>D>D1, and wherein D denotes a spacing rule of a design rule that is implemented to fabricate the PUF structure.

16. The integrated circuit chip of claim 13, wherein the distance D1 is selected so that a percentage of merged source and drain structures, which are formed between the pairs of semiconductor fin structures that have overlapping end portions separated by the distance D1, is within a range of about 30% to about 70%.

17. The integrated circuit chip of claim 13, further comprising a readout circuit connected to the contact terminals of the PUF structure to readout a random code provided by the PUF structure.

* * * * *